United States Patent [19]

Kamiya et al.

[11] Patent Number: 4,512,626

[45] Date of Patent: Apr. 23, 1985

[54] ROTATING MIRROR SCANNER

[75] Inventors: Masashi Kamiya, Tokyo; Katsunobu Ueda; Mitsuo Sumiya, both of Yokohama; Tameyasu Tsukada, Tokyo, all of Japan

[73] Assignee: Tokyo Shibaura Denki Kabushiki Kaisha, Kawasaki, Japan

[21] Appl. No.: 504,424

[22] Filed: Jun. 15, 1983

[30] Foreign Application Priority Data

Jun. 24, 1982 [JP] Japan ................... 57-107529

[51] Int. Cl.³ ............................................. G02B 27/17
[52] U.S. Cl. ........................................ 350/6.8; 318/558
[58] Field of Search ........................................... 350/6.8

[56] References Cited

U.S. PATENT DOCUMENTS 3,874,778  4/1975  Kato et al.
4,141,620  2/1979  Goshima et al.

FOREIGN PATENT DOCUMENTS 6854  3/1978  Japan.
35118  4/1981  Japan.

OTHER PUBLICATIONS

Kameyama et al., "Advanced Rotating Mirror Laser Beam Scanner", NHK Laboratories Note, Ser. No. 242, 10/1979, pp. 1-10.

Primary Examiner—John K. Corbin
Assistant Examiner—Rebecca D. Gass
Attorney, Agent, or Firm—Cushman, Darby & Cushman

[57] ABSTRACT

In a rotating mirror scanner, a polygonal mirror is fixed between a pair of journals of a spindle. A rotor is fixed on the spindle, and a rotor magnet constituting a magnetic thrust bearing is fixed to one end of the spindle. One bearing of a dynamic pressure type and a ring-shaped stator magnet which constitutes the magnetic thrust bearing are both fixed in a hollow housing having an opening. The spindle is inserted into the housing through the opening thereof so that the outer peripheral surface of the rotor magnet faces the inner peripheral surface of the stator magnet, and that one journal is fitted in the one bearing. Thus, the spindle is set in the housing. A cover having the other bearing is fitted in the opening of the housing so that the other journal is supported by the other bearing.

13 Claims, 12 Drawing Figures

ROTATING MIRROR SCANNER

BACKGROUND OF THE INVENTION

This invention relates to a scanner for deflecting a light beam for scanning by a rotating polygonal mirror.

Recently laser printers using a laser have been developed. One such laser printer, as shown in FIG. 1, comprises a semiconductor laser 1, a rotating mirror scanner 2, a drum 4 having a photoconductor surface 3, etc. In this laser printer, a laser beam generated from the semiconductor laser 1 is converged by a beam compressor 5 and directed toward a modulator 6. In the modulator 6, the laser beam is modulated in intensity in accordance with an electrical signal applied to the modulator 6. After passing through the modulator 6, the laser beam is projected on a polygonal mirror 8 of the scanner 2 through a beam expander 7. The laser beam reflected by the reflecting surface of the polygonal mirror 8 is projected on the photoconductor surface 3 of the drum 4 through a projection lens system or fθ lens system 9. As the polygonal mirror 2 is rotated at a constant speed, the laser beam reflected by the reflecting surface of the polygonal mirror 8 is deflected, and the photoconductor surface 3 is scanned by the laser beam. Since the laser beam is modulated in intensity by the modulator 6, and since the drum 4 is rotated in a fixed direction at a constant speed, a latent image, such as a pattern or characters, is formed on the photoconductor surface 3.

The rotating mirror scanner 2 has an advantage over a deflector using an electro-optical crystal in that it deflects a laser beam at a greater deflection angle. In order to obtain high resolution on a laser printer, it is generally necessary that the laser beam be deflected at a high deflection speed by the rotating mirror scanner 2. In other words, the rotational frequency of the rotating mirror scanner 2 to determine the deflection speed must be high, preferably $10^4$ rpm, for example. The rotating mirror scanner 2 is expected to rotate not only at a high frequency, but also with high accuracy and stability. Beside these requirements, the rotating mirror scanner must meet the following requirements:

(1) The polygonal mirror should not be contaminated by spindle oil or the like while rotating.

(2) Rotating parts should not be subject to complicated vibration modes or, in particular, high-frequency vibration during rotation.

(3) Less friction torque loss even at the start and during steady-state rotation.

(4) Long life.

(5) High portability.

(6) Ease of balance correction.

In a conventional motor unit which attempts to satisfy these requirements, the spindle is rotatably supported by bearings of a hydrodynamic pressure type. The dynamic pressure type bearings may be classified into two subtypes: herringbone dynamic pressure type bearings and tilting-pad dynamic pressure type bearings. The bearings of both these types cannot, however, be readily manufactured, and are unfit for mass production. As a thrust bearing for the spindle, a permanent magnet bearing of an uncontrolled or repulsion type is disclosed in Japanese Patent Publication No. 53-6854. This magnetic thrust bearing is an independent unit, and cannot readily attain static balance by itself. If subjected to an external dynamic force, the thrust bearing varies in its rigidity according to the direction of the vector of the working force which is unsettled. Thus, the thrust bearing is low in stability and rigidity. A controlled magnetic thrust bearing combining a permanent magnet and a coil has advantages over an uncontrolled one in both stability and rigidity. Since it requires peripheral equipment, however, the controlled magnetic thrust bearing complicates the construction of the motor, and is not suitable for low cost manufacture.

A more essential problem is that the rotational accuracy of the scanner might be decreased by a process for correcting the rotational balance of the rotating part of the scanner. In the prior art rotating mirror scanner, the rotor of the motor is mounted on a spindle between a pair of hydrodynamic bearings. A polygonal mirror is attached to one free end of the spindle extending from one bearing, while a magnetic thrust bearing is provided at the other free end of the spindle extending from the other bearing. In general, when the rotor as the rotating part to be rotated with the spindle, the polygonal mirror, and the magnetic thrust bearing are mounted on the spindle, their balance is corrected by a balancing machine. In the scanner with this structure, the spindle mounted with the balanced rotating part cannot be set in the hydrodynamic pressure type bearings as it is. In setting the spindle in the bearings, therefore, the rotating part is once removed from the spindle, then only the spindle is fitted in at least one of the bearings, and finally the rotating part is mounted on the spindle. Thus, the rotational balance of the scanner may possibly be lost which would lower the rotational accuracy after the assembly. In the prior art printer system, moreover, the scanner and the fθ lens or other optical system are provided independently, so that it is difficult to align the optical axis of the fθ lens with that of the scanner.

SUMMARY OF THE INVENTION

The object of this invention is to provide a rotating mirror scanner easy to assemble, long-lived, and capable of rotating a polygonal mirror at high speed and with high accuracy.

According to this invention, there is provided a rotating mirror scanner which comprises a spindle having a pair of journals, a rotor rotating with the spindle, a stator for rotating the rotor, a pair of bearings individually receiving the pair of journals, a polygonal mirror disposed between the pair of journals and fixed on the spindle, a housing fixedly fitted with one of the bearings and the stator and having at least one window facing the polygonal mirror so that a light reflected from the polygonal mirror passes through the window, the housing having an opening through which the rotor, the polygonal mirror, and the one bearing are inserted, a cover fitted with the other bearing and removably closing the opening, and means for floating the spindle, the means including at least one rotor magnet fixed on the spindle, and a stator magnet fixed to the housing so that the rotor magnet is inserted therein and having an inner surface facing the outer surface of the rotor magnet with a gap therebetween, the facing surfaces of the rotor and stator magnets being opposite in pole ity.

DETAILED DESCRIPTION OF THE PREFERRED EMBODIMENTS

Figure 1:
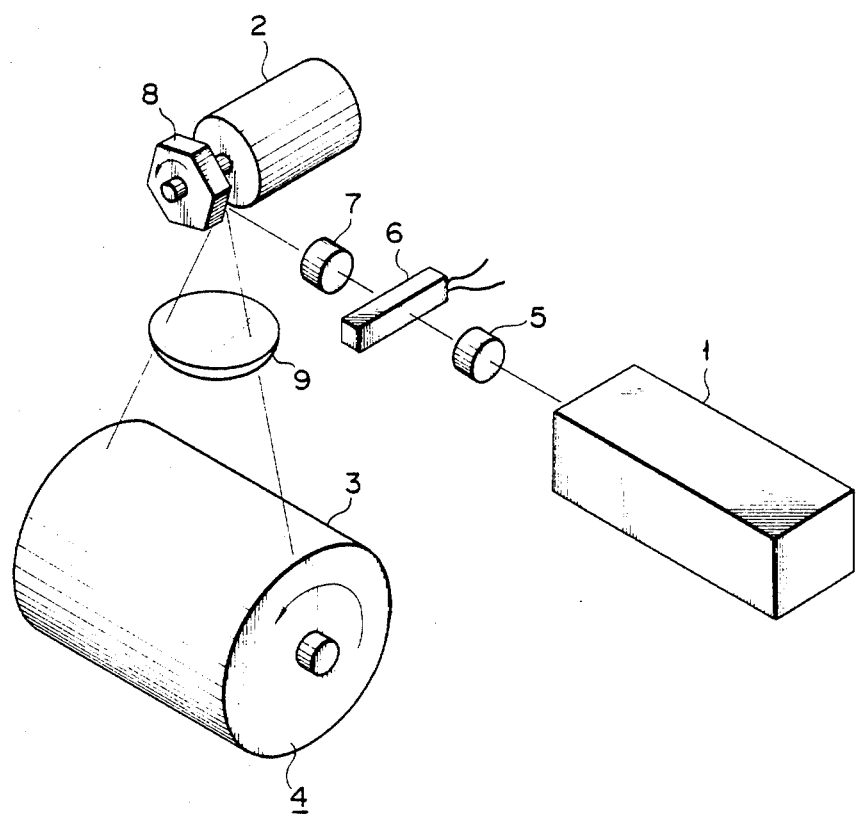
FIG. 1 is a schematic view showing a printer system including a prior art rotating mirror scanner.
Figure 2:
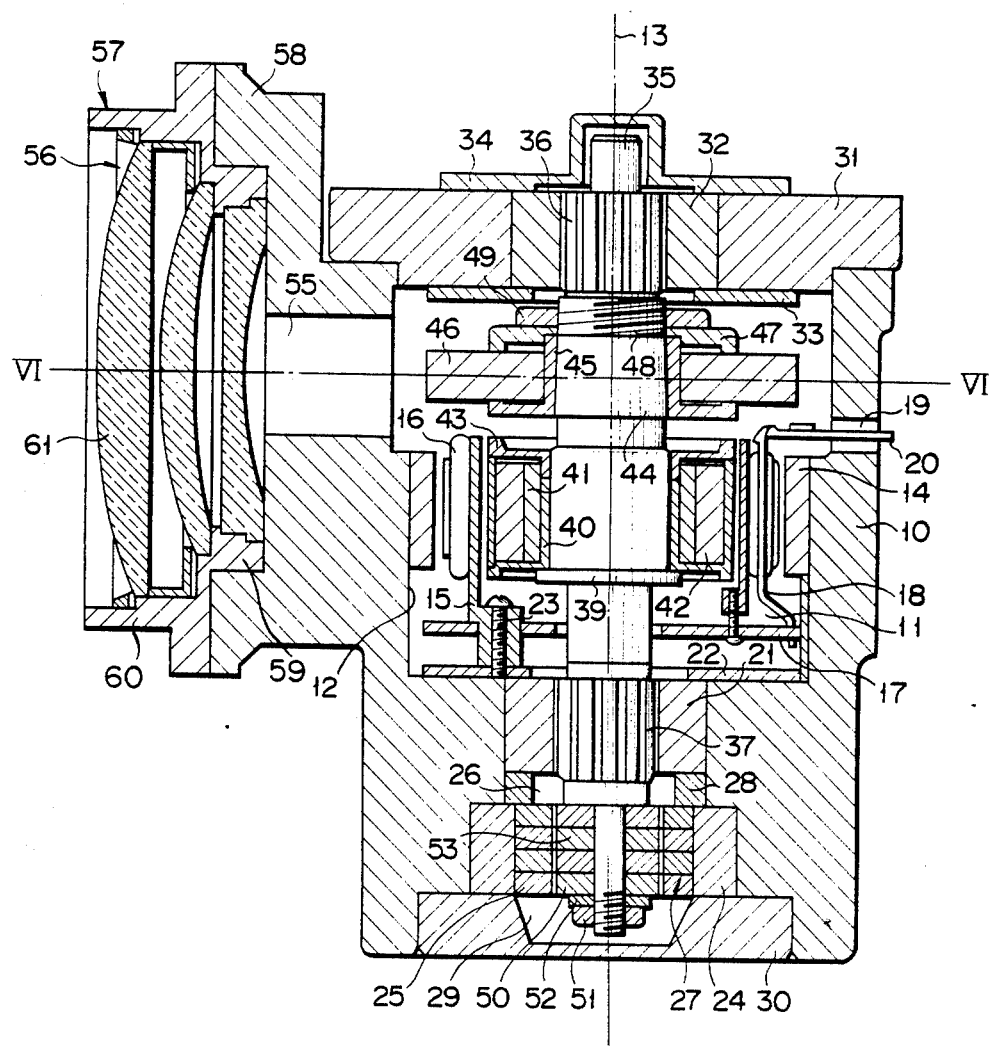
FIG. 2 is a sectional view schematically showing one embodiment of the rotating mirror scanner of this invention.

Referring now to FIG. 2, there is shown a rotating mirror scanner according to one embodiment of this invention. In this scanner, a cylindrical armature 14 is fixed to the inner surface 12 of a hollow housing 10 defining a hollow space 11 therein. The armature 14 is a laminate formed of annular metal plates coaxial with the central axis 13 of the hollow housing 10. A substantially cylindrical coil bobbin 15 is located in the hollow space 11, facing the inner surface of the armature 14. The coil bobbin 15 has a number of projection pieces protruding from its outer peripheral surface toward the inner surface of the armature 14 and extending along the central axis 13 of the hollow housing 10. A conductive wire is wound around the projection pieces to form a coil 16. As shown in FIG. 2, the coil 16 is electrically connected to a circuit board 17 which includes a driver circuit for controlling current to be supplied to the coil 16. The coil bobbin 15 is screwed to the circuit board 17, which is fixed to the inner surface 12 of the hollow housing 10. Also, the circuit board 17 is electrically connected by means of lead wires 18 to connector pins 20 which extend through a through hole 19 in the peripheral wall of the hollow housing 10.

Figure 3:
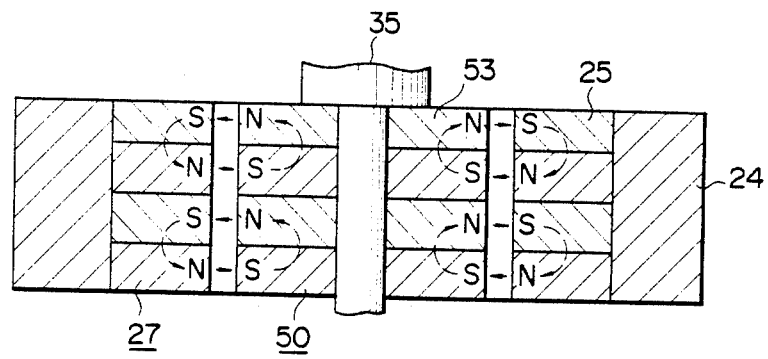
FIG. 3 is a sectional view schematically showing a magnetic thrust bearing shown in FIG. 2.

A hole 26 is coaxially formed in the hollow housing 10, connecting with the hollow space 11. A cylindrical first bearing 21 of a dynamic pressure type (described in detail later) is coaxially fitted in the hole 26. One end face of the first bearing 21 closes part of the opening of the hole 26, and abuts against an annular plate 22 fixed to the inner surface 12 of the housing 10 which defines the hollow space 11. The coil bobbin 15 is fixed to the annular plate 22 by means of a screw 23. A recess 29 is coaxially formed in the hollow housing 10, connecting with the hole 26. A cylindrical magnet holder 24 is coaxially fitted in the recess 29. As shown in FIG. 3, a stator magnet assembly 27 of a laminated structure composed of ring-shaped permanent magnets 25, e.g., ferrite magnets, is fixed to the magnet holder 24 by using an adhesive agent. A ring-shaped spacer 28 is fitted in the hole 26 of the housing 10 so as to be interposed between each end face of the stator magnet assembly 27 and the magnet holder 24 and the other end face of the first bearing 21. A cover 30 is fixedly fitted in the opening of the recess 29. Thus, the first bearing 21, the spacer 28, the stator magnet assembly 27, and the magnet holder 24 are held between the cover 29 and the annular plate 22.

The opening of the hollow housing 10 is closed by a discoid base plate 31 having a through hole coaxial with the axis 13 of the housing 10. Part of the base plate 31 is fitted in the opening of the hollow housing 10. The base plate 31 is removably attached to the housing 10 by means of a screw (not shown). A second bearing 32 of a hydrodynamic pressure type is inserted in the through hole of the base plate 31 so as to be coaxial with the axis 13 of the housing 10. The second bearing 32 is fixedly held between an annular plate 33 fixed to one surface of the base plate 31 and a dust cover 34 fixed to the other surface of the base plate 31.

Figure 4:
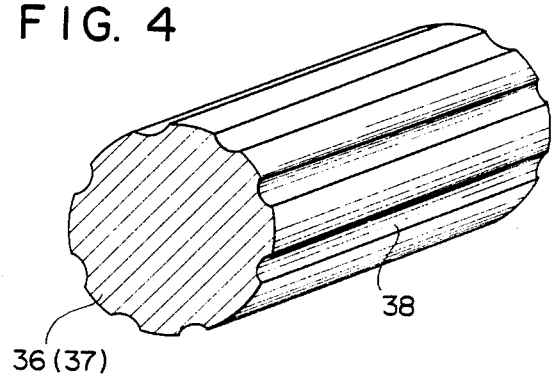
FIG. 4 is a perspective view of a support section of a spindle shown in FIG. 2.
Figure 5:
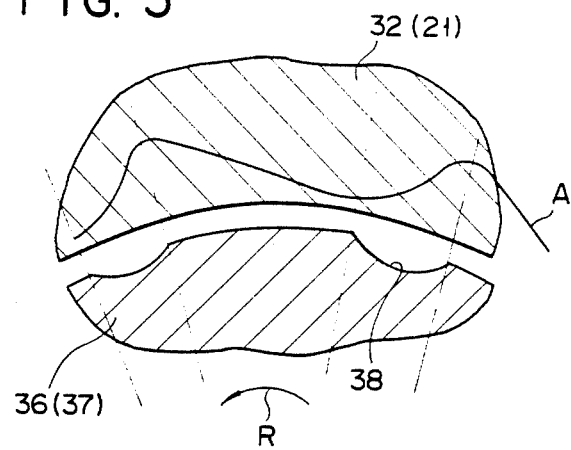
FIG. 5 is a partial sectional view showing a bearing of a dynamic pressure type shown in FIG. 2 and the support section of the spindle supported by the bearing.

A spindle 35 is coaxially disposed in the housing 10, with its support sections, i.e., journals 36 and 37, received in the bearings 32 and 21, respectively. The clearances between the journals 36 and 37 and the bearings 32 and 21 range from several microns to ten-to-twenty microns. As shown in FIG. 4, a plurality of grooves 38 are arranged at substantially regular intervals around each of the support sections or journals 36 and 37, extending along the axis 13 of the hollow housing 10. As shown in FIG. 5, for example, the cross section of each groove 38 is substantially semicircular, and has a depth of several to several tens of microns and a width of 0.1 to 0.5 of microns. Six to thirty such grooves 38 are formed on the spindle 35 by grinding or cutting.

A flange holder 39 is fixed on that portion of the spindle 35 which corresponds to the coil bobbin 15. A cylindrical lower rotor case 40 is fixed to the flange holder 39. The lower rotor case 40 houses a cylindrical rotor core 41 on the inside and a cylindrical rotor magnet 42 on the outside. The rotor core 41 and the rotor magnet 42 are covered with an upper rotor case 43 which is fixed on the spindle 35. The rotor case 41 and the rotor magnet 42 are immovably fixed to the spindle 35 by the lower and upper rotor cases 40 and 43. A taper section 44 tapered toward the annular plate 33 is formed on the spindle 35 at that portion thereof between the upper rotor case 43 and the annular plate 33. A mirror holder 45 is fixed on the taper section 44, and a polygonal mirror 46 is mounted on the mirror holder 45 so that the mirror holder 45 is inserted in a through hole in the polygonal mirror 46. A mirror cover 47 is put on the polygonal mirror 46 so that the mirror 46 is held and fixed between the mirror cover 47 and the mirror holder 45 by a nut plate 49 which is fitted on a screw portion 48 of the spindle 35.

A rotor magnet assembly 50 facing the inner surface of the stator magnet assembly 27 is fixed on the spindle 35 at that portion thereof which is inside the recess 29 by means of a nut 51 fitted on the lower end portion of the spindle 35 and a washer 52. The rotor magnet assembly 50 is formed of ring-shaped permanent magnets, e.g., ferrite magnets, stacked in layers and fixed to one another by means of an adhesive agent, and has an outside diameter shorter than the inside diameter of the dynamic pressure type bearing 21. As shown in FIG. 3, the outer peripheral surfaces of the individual permanent magnets 53 of the rotor magnet assembly 50 are magnetized in opposite polarity to the inner surfaces of their corresponding permanent magnets 25 of the stator magnet assembly 27. The surfaces of the laminated magnets 25 and 53 of the stator and rotor magnet assemblies 27 and 50 are so magnetized that the north and south poles are arranged alternately, as shown in FIG. 3. A clearance of hundreds of microns is kept between the inner surface of the stator magnet assembly 27 and the outer surface of the rotor magnet assembly 50. These two assemblies 27 and 50 constitute a magnetic thrust bearing. The number of the magnets of the stator and rotor magnet assemblies 27 and 50 depends on their magnetic force, the gross weight of the spindle 35 and the elements mounted thereon, and other factors.

Figure 6:
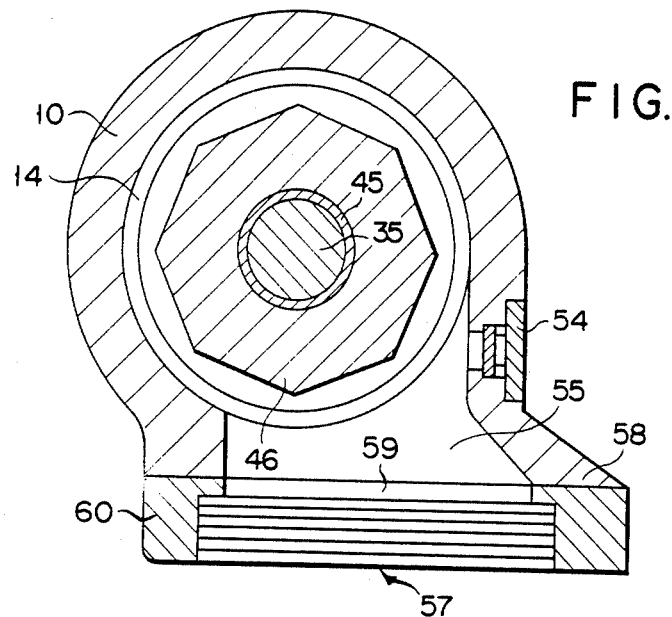
FIG. 6 is a schematic sectional view taken along line VI—VI of FIG. 2.

As shown in FIG. 6, the housing 10 is provided with a laser beam incidence window 54 which defines an optical path through which a laser beam directed toward the polygonal mirror 46 passes. Normally, the laser beam is projected at right angles to the axis 13 of the spindle 35 through the incidence window 54 so as to be incident on the polygonal mirror 46 which has reflecting surfaces parallel to the axis 13. Also, the housing 10 has a through hole 55 which defines the reflection path of the laser beam reflected by the polygonal mirror 46. The housing 10 is further provided with a frame structure 57 for mounting an fθ lens system 56. The frame structure 57 includes a base 58 which includes an opening for the through hole 55, and an attachment frame 60 which has a ring space section 59 fitted in the base 58. An fθ lens 61 is fixed to the base 58 by means of the attachment frame 60 in the manner shown in FIG. 2. In FIG. 6, the fθ lens 61 is omitted for the simplicity of illustration. The optical axis of the fθ lens system 56 is at right angles to the axis 13 of the spindle 35.

In the rotating mirror scanner described above, loops of lines of magnetic force, as indicated by broken lines in FIG. 3, are formed between the stator and rotor magnet assemblies 27 and 50 of the magnetic thrust bearing, so that the two magnet assemblies 27 and 50 attract each other. Thus, the spindle 35 and the rotor magnet 42 and other elements fixed on the spindle 35 are retained by the magnetic thrust bearing. If each of the stator and rotor magnet assemblies 27 and 50 is formed of four ring-shaped ferrite magnets of 4-mm thickness, each having magnetic energy of $1 \times 10^6$ Goe, then it can bear a load of 10 newton [F].

When current is supplied through the connector pins 20 to the coil 16 while the spindle 35 is thus supported by the magnetic thrust bearing, the spindle 35 is rotated. Since the spindle 35 is then floated in the axial direction, its initial starting torque is provided only by the sliding frictional force produced at the two dynamic pressure type bearings 21 and 32. Thus, the initial starting torque is 50 g.cm or less, so that the friction torque loss is very small.

Even if an axial disturbing force is applied to the spindle 35, the radial magnetic force of the magnetic thrust bearing urges the spindle 35 to return to its original position, thereby eliminating the influence of the axial disturbing force. As the rotational frequency of the spindle 35 increases, air is caught in the grooves 38 of the support sections or journals 36 and 37, and a dynamic pressure as represented by dynamic pressure curve A in FIG. 5 is produced. In FIG. 5, the direction of rotation is indicated by arrow R. The dynamic pressure is produced by a combined effect of stepping action or vortex motion of the air caught in the grooves 38 and wedge action on the inner peripheral surfaces of the dynamic pressure type bearings 21 and 32 corresponding to the individual grooves 38. Accordingly, the spindle 35 is radially supported in a contacting manner by the bearings 21 and 32. Thus, the whirling accuracy of the spindle 35 is as high as 0.1 micron or less at $1.5 \times 10^4$ rpm. Since each groove 38 of the dynamic pressure type bearings of this embodiment has an arcuate cross section and extends parallel to the axis of the spindle 35, the spindle 35 can be rotated in both forward and reverse directions. Since the bearings of this embodiment, moreover, are of a full arc type, the grooves 38 can be formed by a conventional chemical etching process or machine work using a milling machine or grinder. Thus, these bearings can be manufactured more efficiently and at lower cost than can conventional herringbone or tilting-pad type bearings. According to this embodiment, the bearing 32 is attached to the base plate 31 which is removably fitted in the upper end portion of the hollow housing 10, and the outside diameter of the rotor magnet assembly 50 is shorter than the inside diameter of the bearing 21. Accordingly, the spindle 35 mounted with the polygonal mirror 46, the support section 36, the rotor section of the motor, etc., can be inserted into the hollow housing 10 through the opening thereof after it is adjusted for balance. Thus, the spindle 35 can enjoy high rotational accuracy. Further, the reflecting surfaces of the polygonal mirror 46 can be finished on the basis of the axis of the spindle 35 after the polygonal mirror 46 in its rough state is mounted on a predetermined portion of the spindle 35. Thus, the parallelism between the axis of the spindle 46 and the reflecting surfaces of the polygonal mirror 46 can be greatly improved, and the whirling of the polygonal mirror 46 in rotation can be minimized. Since the polygonal mirror 46 is disposed between the two bearings 21 and 32, the whirling of the spindle 35 in a conical rotation mode is reduced as compared with the case where the polygonal mirror 46 is mounted on the upper end portion of the spindle 35. Owing to all these effects, the spindle 35 of this embodiment may enjoy a rotation accuracy of 0.1 micron or less at $1.5 \times 10^4$ rpm and a tilt angle θ of 1 second or less for the conical rotation mode. According to this embodiment, moreover, the fθ lens frame structure is attached to the housing 10, so that the optical axis alignment for the deflected light beam from the polygonal mirror 35 is facilitated. Thus, according to the rotating mirror scanner of this embodiment, a stable high deflection speed may be obtained so that the resolution can be improved.

Figure 7:
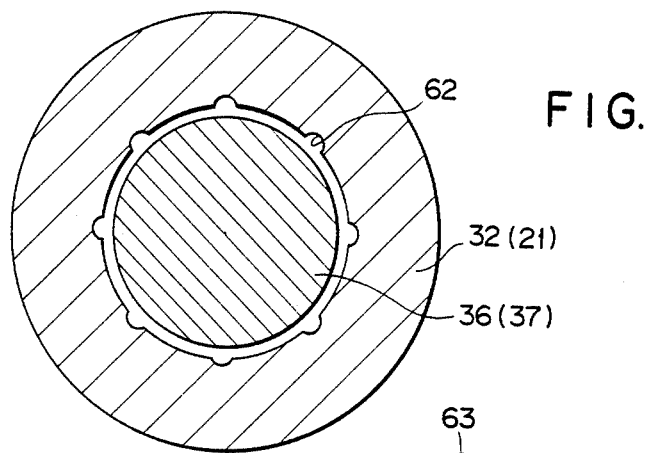
FIGS. 7 and 8 are sectional views showing dynamic pressure type bearings and support sections of spindles supported individually by the bearings according to alternative embodiments of the invention.
Figure 8:
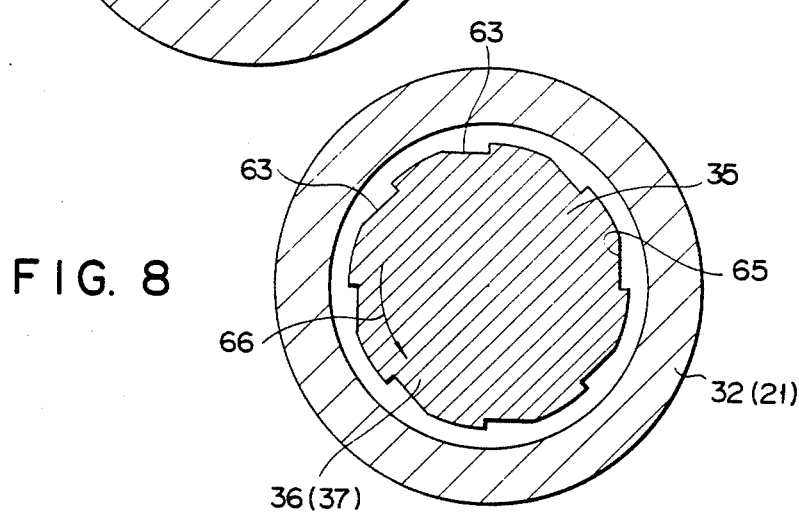
Figure 9:
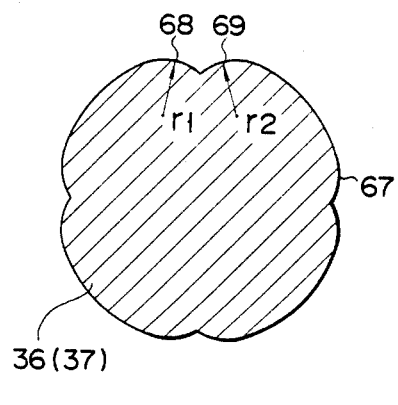
FIGS. 9 to 12 are sectional views showing support sections of spindles according to further alternative embodiments of the invention.
Figure 10:
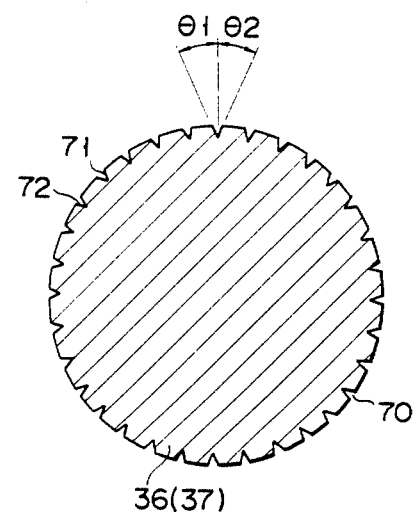
Figure 11:
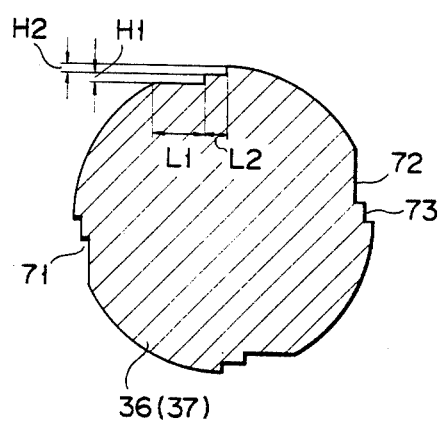
Figure 12:
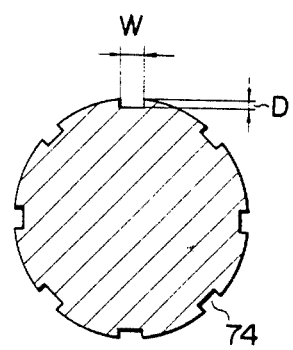

This invention is not limited to the embodiment described above. Instead of forming the grooves 38 on the spindle 35, for example, a plurality of grooves 62 each having an arcuate cross section may be formed at regular intervals on the inner peripheral surface of each of the dynamic pressure type bearings 21 and 32 so as to extend parallel to the axis of the bearing, as shown in FIG. 7. Alternatively, as shown in FIG. 8, a plurality of grooves 63 each having an L-shaped cross section may be formed at regular intervals on the spindle 35 so as to extend parallel to the axis of the spindle 35. The grooves 63 are each defined by first and second surfaces 64 and 65 crossing at right angles. The respective second surfaces 65 of each two diametrically opposite grooves 63 arranged along the circumference of the spindle 35 are located on the same diametrical line of the spindle 35. In this case, the rotating direction of the spindle 35 is limited to the direction indicated by an arrow 66. As shown in FIG. 9, moreover, four grooves 67 parallel to the axis of the spindle 35 may be formed at circumferential intervals of 90° on the outer peripheral surface of the spindle 35. The grooves 67 are each defined by a first arcuate surface 68 with a radius $r_1$ and a second arcuate surface 69 with a radius $r_2$. The depth and cross-sectional configuration of the grooves 67 may be varied by changing the radii $r_1$ and $r_2$. If the two radii $r_1$ and $r_2$ are made equal, the spindle 35 can be rotated in both forward and reverse directions. Alternatively, as shown in FIG. 10, fifteen to thirty V-shaped grooves 70 parallel to the axis of the spindle 35 and each having a depth of tens of microns and a width of hundreds of microns may be formed on the outer peripheral surface of the spindle 35. In this case, a desired dynamic pressure characteristic may be obtained by suitably setting the tilt angles $\theta_1$ and $\theta_2$ formed between the center line of each groove 70 and a pair of surfaces 71 and 72 defining the groove 70. If the angles $\theta_1$ and $\theta_2$ are made equal, the spindle 35 will not be restricted in its rotating direction. As shown in FIG. 11, moreover, grooves 71 parallel to the axis of the spindle 35 may be formed from two stepped portions 72 and 73. In this case, the dynamic pressure characteristic may be varied by individually changing the lengths $L_1$ and $L_2$ and heights $H_1$ and $H_2$ of the stepped portions 72 and 73. Furthermore, the dynamic pressure characteristic may be adjusted by suitably setting the width W and depth D of rectangular grooves 74 extending parallel to the axis of the spindle 35, as shown in FIG. 12. The thrust bearing or bearings may be attached to the upper end or both ends of the spindle without departing from the scope of this invention.

In the rotating mirror scanner according to this invention, a spindle mounted with a polygonal mirror is radially supported by two bearings of a dynamic pressure type, and is axially supported by a magnetic thrust bearing. These bearings are of a full arc type, and can be formed by conventional cutting work. Therefore, the dynamic pressure type bearings can be manufactured at lower cost than those of the tilting-pad and herringbone type bearings. The magnetic thrust bearing axially supports the spindle utilizing radial attraction. As compared with the repulsion type magnetic thrust bearing, therefore, this magnetic thrust bearing has better rigidity and stability. According to this invention, moreover, the polygonal mirror is mounted between the two bearings, and the spindle can be fully mounted when it is inserted into a housing. Thus, according to the present invention, there is provided a high-reliability rotating mirror scanner which hardly whirls even while rotating at a speed of $10^4$ rpm or more. In the rotating mirror scanner of this invention, furthermore, an $f\theta$ lens frame structure is integrally attached to the housing, so that optical axis alignment for an $f\theta$ lens system may be facilitated.

What we claim is:

1. A rotating mirror scanner comprising:
   a spindle having a pair of journals;
   a rotor rotating with the spindle;
   a stator for rotating the rotor;
   a pair of bearings individually receiving the pair of journals;
   a polygonal mirror disposed between the pair of journals and fixed to the spindle;
   a housing fixedly fitted with one of the bearings and the stator and having at least one window facing the polygonal mirror so that a light reflected from the polygonal mirror passes through the window, the housing having an opening through which the rotor, the polygonal mirror, and the one bearing are inserted;
   a cover fitted with the other bearing and removably closing the opening; and
   means for floating the spindle, the means including at least one rotor magnet fixed on the spindle, and at least one stator magnet fixed to the housing so that the rotor magnet is inserted therein and having an inner surface facing the outer surface of the rotor magnet with a gap therebetween, the facing surfaces of the rotor and stator magnets being opposite in polarity.

2. The rotating mirror scanner according to claim 1, further comprising an $f\theta$ lens system attached to the housing so as to face the window of the housing.

3. The rotating mirror scanner according to claim 1, wherein said rotor magnet of the means for floating the spindle has an inside diameter shorter than that of the one bearing.

4. The rotating mirror scanner according to claim 1, wherein each said bearing is of a dynamic pressure type, and has a number of grooves formed on the inner surface thereof, the grooves extending along the axis of the spindle.

5. The rotating mirror scanner according to claim 4, wherein each of said grooves has a semicircular cross section.

6. The rotating mirror scanner according to claim 1, wherein each said journal is of a dynamic pressure type, and has a number of grooves formed on the outer surface thereof, the grooves extending along the axis of the spindle.

7. The rotating mirror scanner according to claim 6, wherein each of said grooves has a substantially semicircular cross section.

8. The rotating mirror scanner according to claim 6, wherein each of said grooves is defined by a pair of surfaces.

9. The rotating mirror scanner according to claim 8, wherein one of said pair of surfaces is formed in the radial direction of the spindle, and the other is formed at substantially right angles to the one surface.

10. The rotating mirror scanner according to claim 8, wherein each said surface is an arcuate surface having a predetermined radius of curvature.

11. The rotating mirror scanner according to claim 6, wherein each of said grooves has a substantially V-shaped cross section.

12. The rotating mirror scanner according to claim 6, wherein each of said grooves is defined by at least two stepped portions.

13. The rotating mirror scanner according to claim 6, wherein each of said grooves has a rectangular cross section.

* * * * *